(12) United States Patent
Wright et al.

(10) Patent No.: US 6,934,827 B2
(45) Date of Patent: Aug. 23, 2005

(54) METHOD AND APPARATUS FOR AVOIDING CACHE LINE COLLISIONS BETWEEN AN OBJECT AND CORRESPONDING OBJECT TABLE ENTRIES

(75) Inventors: Gregory M. Wright, Mountain View, CA (US); Mario I. Wolczko, San Carlos, CO (US); Matthew L. Seidl, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 273 days.

(21) Appl. No.: 10/389,629

(22) Filed: Mar. 13, 2003

(65) Prior Publication Data

US 2004/0181645 A1 Sep. 16, 2004

(51) Int. Cl.[7] .............................................. G06F 12/00
(52) U.S. Cl. ........................ 711/210; 711/208; 711/216; 711/220
(58) Field of Search .......................... 711/208–210, 216, 711/219–220

(56) References Cited

U.S. PATENT DOCUMENTS 5,799,185 A * 8/1998 Watanabe ................... 707/206

OTHER PUBLICATIONS

"The influence of the object–oriented language model on a supporting architecture," Mario Wolczko and Ifor Williams. Proceedings of the 26th Hawaii Conference on System Science, pp. 182–191, Jan. 1993.*
"Object–Based Memory Architecture," Ifor W. Williams. PhD thesis, Department of Computer Science, University of Manchester, May 1989.*
"An Object–Based Memory Architecture," Ifor Williams and Mario Wolczko. In Implementing Persistent Object Bases: Proceedings of the Fourth International Workshop on Persistent Object Systems, pp. 114–130. Morgan Kaufman Pub., 1991.*
"Realisation of a Dynamically Grouped Object–Oriented Virtual Memory Hierarchy." Ifor Williams, Mario Wolczko, and Trevor Hopkins, in Proceedings of the Workshop on Persistent Object Systems: Their Design, Implementation and Use, pp. 298–308, Aug. 1987.*
Vijaykrishnan, N., N. Ranganathan, R. Gadekarla. Jul. 1998. Object–Oriented Architectural Support for a Java Processor. Proceedings of ECOOP'98, the 12th European Conference on Object–Oriented Programming.*
Publication entitled "An Object–Based Memory Architecture," by Ifor Williams et al., published in "Implementing Persistent Object Bases: Proc. Fourth International Workshop on Persistent Object Systems", Morgan Kaufmann, 1991, pp. 114–130.

* cited by examiner

Primary Examiner—Donald Sparks
Assistant Examiner—Jesse Diller
(74) Attorney, Agent, or Firm—Park, Vaughan & Fleming LLP; Edward J Grundler (57) ABSTRACT

One embodiment of the present invention provides a system that facilitates avoiding collisions between cache lines containing objects and cache lines containing corresponding object table entries. During operation, the system receives an object identifier for an object, wherein the object identifier is used to address the object in an object-addressed memory hierarchy. The system then applies a mapping function to the object identifier to compute an address for a corresponding object table entry associated with the object, wherein the mapping function ensures that a cache line containing the object table entry does not collide with a cache line containing the object.

12 Claims, 5 Drawing Sheets

METHOD AND APPARATUS FOR AVOIDING CACHE LINE COLLISIONS BETWEEN AN OBJECT AND CORRESPONDING OBJECT TABLE ENTRIES

BACKGROUND

1. Field of the Invention

The present invention relates to the design of computer systems that support references to objects defined within an object-oriented programming system. More specifically, the present invention relates to an object addressing scheme that avoids collisions between cache lines containing objects and cache lines containing corresponding object table entries.

2. Related Art

As object-oriented programming languages become more widely used, computer systems are being designed to manipulate objects more efficiently. Note that in order to manipulate objects, computer systems also manipulate ancillary data structures associated with objects. For example, each object in an object-oriented programming system is typically associated with an object table entry that contains metadata associated with the object, such as the object's physical address (if the object has one).

Hence, in order to access the object it may be necessary to first access the object table entry for the object to determine the physical address of the object. This process is outlined in FIG. 1 which illustrates how a computer system uses an object identifier (OID) 104 to reference an object table entry (OTE) 108 from an object table 106. (Note that object table 106 also contains entries for other objects.) Next, the computer system retrieves a physical address 110 for the object from object table entry 108 and uses the physical address 110 to access the object 102 in physical memory 112.

Note that this process for accessing an object can be performed within an object-addressed memory hierarchy, wherein objects can be accessed through object identifiers in cache memory, but are otherwise accessed through corresponding physical addresses in physical memory.

Figure 1:
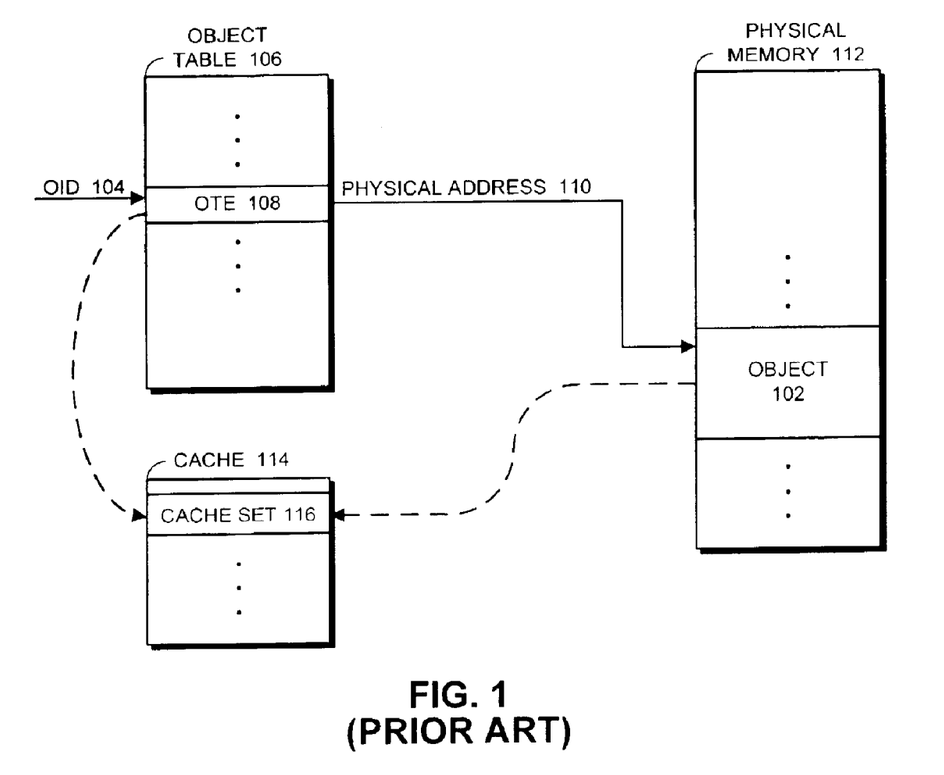
FIG. 1 illustrates an object table and an associated object.

There are a number of different ways to implement object table 106 within an object-addressed memory hierarchy. (1) Object table 106 can be implemented as a table in physical memory 112. However, note that object table 106 is a fixed fraction of the size of the entire object address space, which means that it can potentially occupy a large amount of memory. Hence, it is typically impractical to dedicate such a large portion of physical memory 112 to object table 106. (2) Alternatively, object table 106 can be implemented as a table in virtual memory. However, this requires the object translation process to understand and manipulate page tables, which can introduce additional complexity and delay into the address translation process. (3) A more attractive option is to embed the object table itself into objects. In this way the translation process only needs to perform one type of operation.

Unfortunately, accesses to the object table can potentially interfere with accesses to corresponding objects. In particular, it is possible for object table entries and objects to interfere with each other in a cache. Referring to FIG. 1, if a cache line for an object 102 maps to the same cache set 116 in cache 114 as a cache line for corresponding object table entry 108, some problems can occur. For example, the computer system may frequently need to manipulate the object 102 and its object table entry 108 together, without adversely affected performance if they cannot reside in the cache at the same time.

Hence, what is needed is a method and an apparatus for avoiding interference between cache lines containing objects and cache lines containing corresponding object table entries.

SUMMARY

One embodiment of the present invention provides a system that facilitates avoiding collisions between cache lines containing objects and cache lines containing corresponding object table entries. During operation, the system receives an object identifier for an object, wherein the object identifier is used to address the object in an object-addressed memory hierarchy. The system then applies a mapping function to the object identifier to compute an address for a corresponding object table entry associated with the object, wherein the mapping function ensures that a cache line containing the object table entry does not collide with a cache line containing the object.

In a variation on this embodiment, the corresponding object table entry is located within an object table object that is part of a hierarchical object table. This hierarchical object table is structured so that each object table object in the hierarchical object table has a corresponding object table entry in a higher-level object table object until a root object table is reached. Moreover, the mapping function ensures that the cache line containing the object does not collide with cache lines for associated object table objects in the hierarchical object table.

In a further variation, a single mapping function is used throughout the hierarchical object table to compute addresses for corresponding object table objects from identifiers for objects or lower-level object table objects.

In a further variation, an object cache that is used to store objects and object table objects is divided into disjoint partitions, wherein each disjoint partition is associated with its own root object table.

In a further variation, for each root object table there exists an ordering of the disjoint partitions. Moreover, the single mapping function maps object table objects from successive levels of the hierarchical object table into successive partitions in the ordering.

In a further variation, applying the single mapping function to the object identifier involves incrementing a set of partition bits in the object identifier, wherein the set of partition bits are lower order bits of the object identifier that specify a partition for the object in the object cache. It also involves shifting remaining bits of the object identifier that are not partition bits, wherein the shifting discards lower order remaining bits and shifts zeros into higher order remaining bits.

In a variation on this embodiment, the system additionally uses the object identifier to address the object in an object cache that is part of the object-addressed memory hierarchy.

In a variation on this embodiment, the system additionally performs an encoding function on the object identifier and an associated object offset to address a relevant cache line in the object cache. This encoding function ensures that partition bits in the object identifier, which specify a partition for the object in the object cache, are unmodified by the encoding process.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 2:
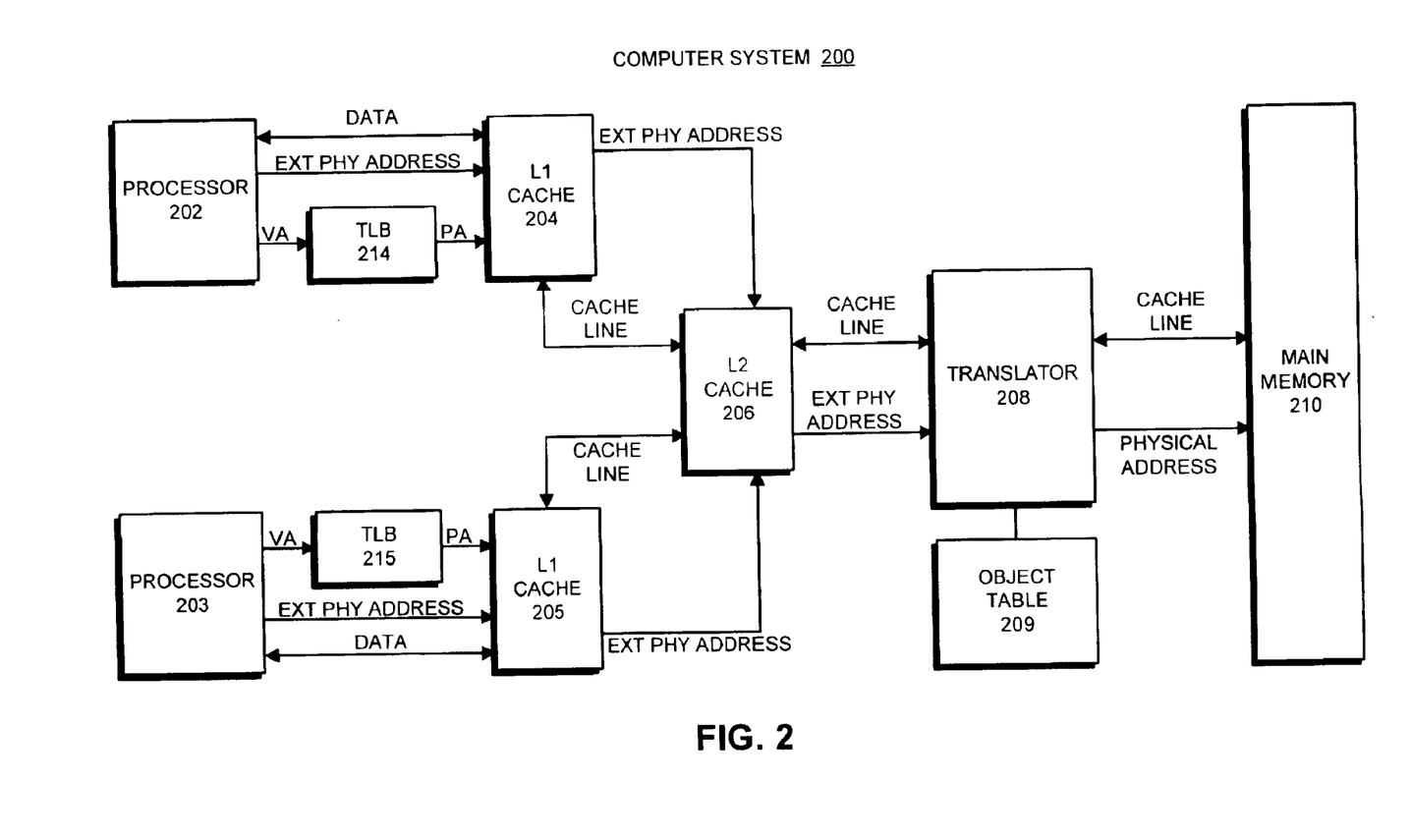
FIG. 2 illustrates a computer system in accordance with an embodiment of the present invention.

FIG. 2 illustrates a computer system 200 in accordance with an embodiment of the present invention. Computer system 200 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 2, computer system 200 includes processors 202 and 203. Processors 202 and 203 access code and data from L1 caches 204 and 205, respectively. Note that L1 caches 204 and 205 can include unified instruction/data caches, or alternatively, separate instruction caches and data caches.

Processors 202 and 203 are associated with translation lookaside buffers (TLBs) 214 and 215, which facilitate translating virtual addresses into physical addresses for non-object references.

L1 cache 204 and L1 cache 205 make use of an extended address encoding procedure that enables L1 cache 204 to function as both a conventional cache and an object cache. For example, during a conventional load operation, a virtual address is sent from processor 202 to TLB 214. TLB 214 translates the virtual address into a physical address, which is subsequently used by L1 cache 204.

In contrast, during a load operation involving a portion of an object, processor 202 obtains the corresponding object ID (OID) and offset and combines them to create an object address. This object address is embedded into an unused portion of the physical address space to produce an encoded address. Note that the higher order bits of this encoded address are typically different than the higher order bits of any physical address. This allows the system to distinguish an encoded address from a physical address. When the encoded address is subsequently sent from processor 202 to L1 cache 204, the encoded address bypasses TLB 214 and directly enters L1 cache 204. Note that only minor modifications are required to conventional cache designs in order to provide object caching using the above-described technique.

In order to request a non-object data item, such as a value from a normal virtual address, processor 202 generates a virtual address that is sent to TLB 214. TLB 214 translates this virtual address into a physical address, which is sent to L1 cache 204.

Note that after an object address is translated into an encoded address L1 cache 204, L1 cache 205 and L2 cache 206 can treat the encoded address in the same manner as a normal physical address.

If a given data item (or instruction) is not located within L1 cache 204 or L1 cache 205, it is retrieved from L2 cache 206. If it is not located within L2 cache 206, it is pulled into L2 cache 206 from main memory 210.

Unlike in a conventional memory hierarchy, a translator 208 is interposed between L2 cache 206 and main memory 210. Translator 208 converts an object address, comprising an object ID and an offset, into a corresponding physical address, which is sent to main memory 210.

If an object is not present within L2 cache 206, the encoded address is forwarded to translator 208. Translator 208 uses an object table 209 to translate the encoded address into a corresponding physical address. Each entry in object table 209 associates a given object ID with a corresponding physical address in main memory where the object resides. In one embodiment of the present invention, object table 209 is a hierarchical object table comprised of object table objects as is described in more detail below with reference to FIGS. 3 through 6.

When a cache miss for an object occurs in L2 cache 206, translator 208 intercepts the encoded address and extracts the object ID. Next, translator 208 uses the object ID to index into the object table 209 for a corresponding physical address. Once the physical address is found, translator 208 converts the load request for the object into a load request for a physical address in main memory 210.

The system uses the physical address and the offset to locate a specific cache line (or cache lines) in main memory 210. Fetching circuitry within translator 208 directs the normal load hardware to issue a load instruction to main memory 210. This fetching circuitry subsequently receives the cache line corresponding to the physical address. The fetching circuitry then forwards the cache line to L2 cache 206.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (440 . . . 107). This overlaps with physical cache lines (0 . . . 63) and (64 . . . 127). In this case, the object is split across two physical cache lines. Hence, two load operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 206, translator 208 converts the encoded address containing the object ID and the offset into a physical address. The fetching circuitry subsequently uses the physical address to generate a store operation to store the evicted cache line in main memory 210. Note that during the process of evicting an object line, it may be necessary to perform a read-modify-write operation on two physical cache lines.

Note that processors 202 and 203 are configured to handle the extended address encoding procedure described above. In one embodiment of the present invention, a platform-independent virtual machine, such as a JAVA VIRTUAL MACHINE, is modified to generate requests for portions of an object using an object ID and an offset. Moreover, in one embodiment of the present invention, processors 202 and 203 are configured to execute special instructions for performing load and store operations involving an object ID and an offset—in addition to normal load and store instructions that use virtual addresses.

Although the present invention is described with reference to a computer system 200 with two levels of cache, the present invention can generally be used with any single-level or multi-level caching structure. Furthermore, although computer system 200 includes two processors, the present invention can generally be used with any number of processors.

Mapping Object Table Objects to Cache Partitions

Figure 3:
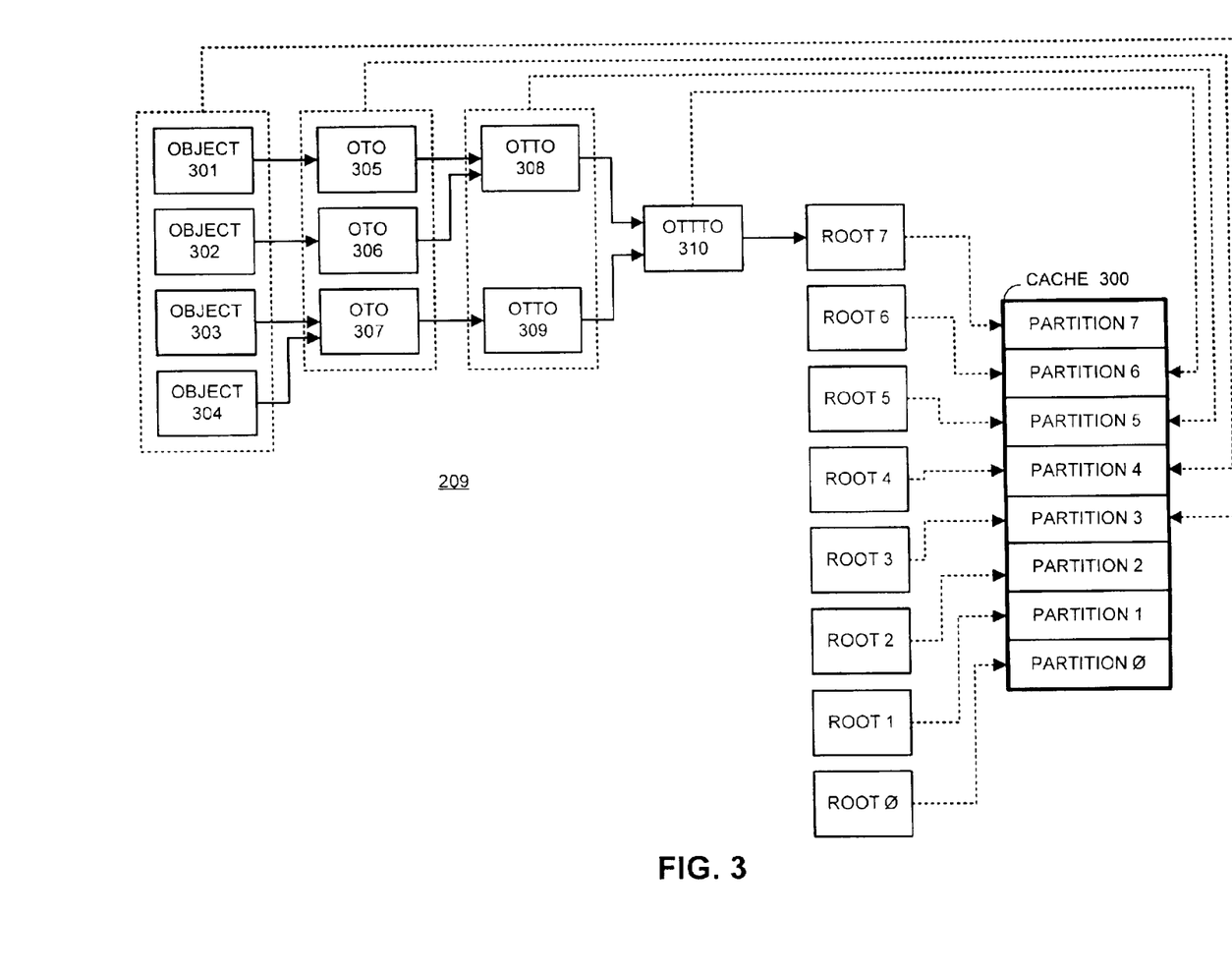
FIG. 3 illustrates how object table objects are mapped to cache partitions in accordance with an embodiment of the present invention.

FIG. 3 illustrates how a hierarchically structured object table 209 (from FIG. 2 above) is mapped into cache partitions in accordance with an embodiment of the present invention. In FIG. 3, a cache 300 is divided into eight disjoint partitions (0–7). This partitioning of cache 300 can be based on three address bits associated with the cache lines that are stored in cache 300. For example, the three lowest order bits of the address for a given cache line (which are above the cache line offset bits) can be used to determine whether the given cache line belongs to a specific partition (0–7).

As is illustrated in FIG. 3, object table 209 includes eight root tables (0–7), which are each associated with corresponding partitions (0–7). Each of these root tables (0–7) is also associated with a tree of object table objects. For purposes of clarity, FIG. 3 only illustrates the tree for root table 7, although similar trees exist (but are not shown) for the other root tables (0–6).

The tree associated with root table 7 includes a number of objects 301–304, which have corresponding object table entries in object table objects (OTOs) 305–307. Object table objects 305–307 have corresponding object table entries in object table table objects (OTTOs) 308–309. Object table table objects 308–309 have corresponding object table entries in object table table table object (OTTTO) 310. Finally, object table table table object 310 has a corresponding object table entry in root table 7. Note that although this example illustrates three levels of object tables, the present invention can generally be applied to object tables with fewer levels or more levels.

Note that there exists a mapping function that maps objects to corresponding object table objects. Moreover, this same mapping function also maps object table objects to higher-level object table objects.

The mapping function ensures that objects and objects table objects in one partition are always mapped to higher-level object table objects in another partition. For example, in FIG. 3, objects 301–304 are mapped to partition 3, while the corresponding object table objects 305–307 are mapped to partition 4. Furthermore, the higher-level object table table objects 308–309 are mapped to partition 5, while the next level object table table table object 310 is mapped to partition 6. Finally, at the highest-level, root table 7 is mapped to partition 7.

Note that so long as this tree is less than eight levels deep, no higher-level object will ever occupy the same cache line as an associated lower-level object. This ensures that a cache line for an object will never collide with a cache line for an associated object table entry.

Address Generation Circuitry

Figure 4:
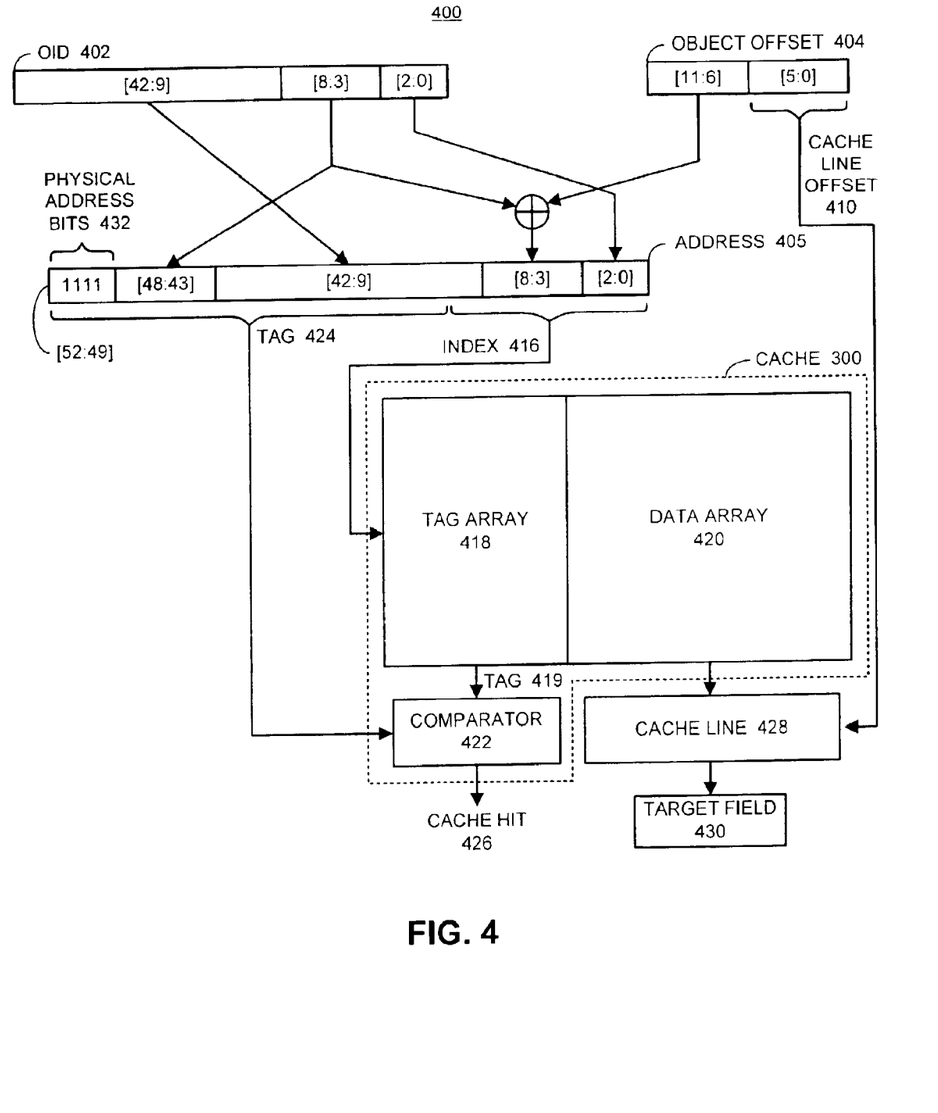
FIG. 4 illustrates how an object identifier and an object offset are used to generate an address that is used to access a cache memory in accordance with an embodiment of the present invention.

FIG. 4 illustrates the structure of address generation circuit 400 in accordance with an embodiment of the present invention. Address generation circuit 400 generates an address for references to a cache 300. As is illustrated in FIG. 4, address generation circuit 400 receives an object identifier 402 that uniquely identifies an object, and an object offset 404 that specifies an offset of a target field within the object. Address generation circuit 400 uses object identifier 402 and object offset 404 to produce an address 405 that is used to access cache 300.

In the embodiment of the present invention illustrated in FIG. 4, object identifier 402 is divided into three fields [42:9], [8:3] and [2:0]. The field [2:0] contains the three lowest order bits of object identifier 402. These three lowest order bits [2:0] specify a partition (0–7) to which the associated object belongs. For example, referring to FIG. 2, if the three lower bits [2:0] of object identifier 402 are "111," the associated object belongs to partition 7. Note that these lowest order three bits [2:0] of object identifier 402 pass through address generation circuit 400 to become the lowest order three bits [2:0] of address 405.

The next field [8:3] of object identifier 402 contains six bits, which are exclusive-ORed with six corresponding bits [11:6] of object offset 404 to produce bits [8:3] of address 405. Note that this exclusive ORing operation serves to randomize bits [11:6] of object offset 404 so that object offsets are distributed evenly throughout sets of cache 300. Bits [8:3] of object identifier 402 are also duplicated in bits [48:43] of address 405 to ensure that the mapping performed by address generation circuit 400 is invertible.

The next field [42:9] of object identifier 402 passes straight through address generation circuit 400 to become bits [42:9] of address 405. Finally, bits [52:49] of address 405 are used to determine whether address 405 is a physical address, or alternatively, an object address generated from an object identifier and an object offset. Note that bits [52:49] of address 405 can be predetermined.

Note that the respective widths of OID 402 (43 bits), address 405 (53 bits) and object offset 404 (12 bits) have been selected for purposes of illustration only. In general, many other widths are possible. For example, OID 402 may be padded out to 64 bits with zeros.

As is illustrated in FIG. 4, the lower-order bits of address 405 comprise an index 416 that feeds into cache 300. Moreover, the remaining higher-order bits of address 405 comprise a tag 424 that also feeds into cache 300.

Index 416 is used to retrieve a tag 419 from tag array 418. It is also used to retrieve a cache line 428 from data array 420. Tag 424 (from address 405) is compared against tag 419 (retrieved from tag array 418) in comparator 422. This produces cache hit signal 426, which indicates whether tags 424 and 419 match.

Note that although the present invention is described in the context of a direct-mapped cache, the present invention can also be applied to other types of caches, such as a set-associative cache.

The operation of the circuitry illustrated in FIG. 4 is described in more detail below with reference to FIGS. 5–6.

Mapping Function

Figure 5:
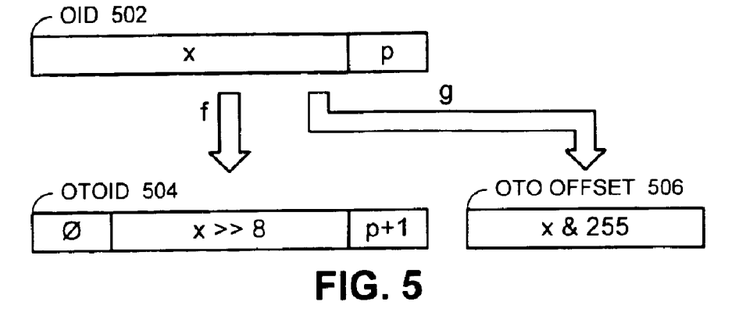
FIG. 5 illustrates a mapping function that generates an object table object identifier and a corresponding offset from an object identifier in accordance with an embodiment of the present invention.

FIG. 5 illustrates a mapping function, f, that generates an object table object identifier (OTOID) 504 and a corresponding object table object (OTO) offset 506 from an object identifier (OID) 502 in accordance with an embodiment of the present invention. The three lower-order bits of object identifier 502 contain a partition number, p, which specifies a partition of the cache to which the object belongs. The higher-order bits are a number, x.

During the mapping process, the partition number, p, is incremented so that the resulting object table object identifier is ensured to be associated with a different partition, p+1, of the cache. At the same time, the number x is shifted by eight bits. This shifting process discards the lower order eight bits of x, and shifts zeros into the higher order eight bits of x. Hence, the function f can be represented as:

$$f(x,p)=\{x>>8, (p+1) \& 7\}.$$

FIG. 5 also illustrates a mapping function, g, which generates an offset 506 for an object table entry (associated with OID 402) within the object table object. Note that the function g performs an ANDing operation with the number 255 to isolate the lower order 8 bits of x. (Note that the number is shifted right by eight bits because there are 256 entries in each OTO, OTTO, etc.) Hence, the function g can be represented as:

$$g(x,p)=x \& 255.$$

Note that the above-described mapping function can be used throughout the hierarchical object table 209 illustrated in FIG. 3 to determine an identifier for higher-level object table from an identifier for an object or a lower level object table. Moreover, the fact that a single function can be used for all levels of hierarchical object table 209 greatly simplifies the design of circuitry that is used to perform this mapping function.

Also note that the mappings f and g that map between an object identifier to a corresponding object table entry can be implemented in hardware as part of translator 208 in FIG. 2, along with the inverse mapping functions to extract the object identifier and the offset for translation.

Mapping Process

Figure 6:
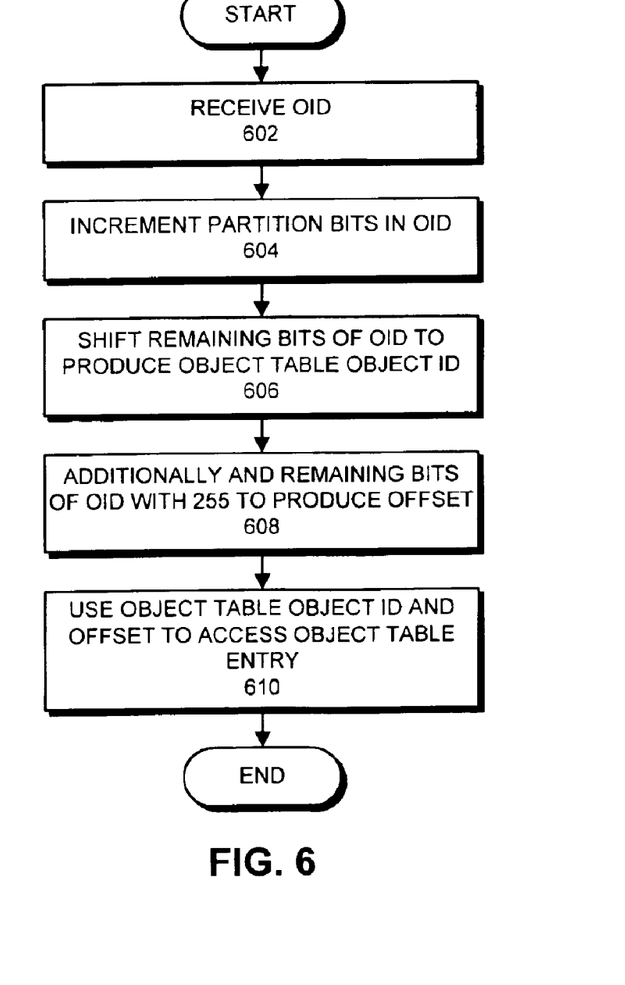
FIG. 6 presents a flow chart illustrating the process of generating an object table identifier for an object identifier in accordance with an embodiment of the present invention.

FIG. 6 is a flow chart illustrating the process of generating an object table identifier for an object identifier in accordance with an embodiment of the present invention. During this process, the system receives an object identifier (OID) 502 (step 602). Next, the system increments the partition number, p, to form a new partition number, p+1 (step 604). The system also shifts the remaining bits, x, of the object identifier 502 as is described above with reference to FIG. 5 (step 606). The system additionally extracts the lower eight bits of x to produce the offset 506 as is described above with reference to FIG. 5 (step 608). The system subsequently uses the resulting object table object identifier (OTOID) 504 and offset 506 to access the corresponding object table entry (step 610).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for avoiding collisions between cache lines containing objects and cache lines containing corresponding object table entries, comprising:
   receiving an object identifier for an object, wherein the object identifier is used to address the object in an object-addressed memory hierarchy; and
   applying a mapping function to the object identifier to compute an address for a corresponding object table entry associated with the object;
   wherein the mapping function ensures that a cache line containing the object table entry does not collide with a cache line containing the object;
   wherein the corresponding object table entry is located within an object table object that is part of a hierarchical object table;
   wherein each object table object in the hierarchical object table has a corresponding object table entry in a higher-level object table object until a root object table is reached;
   wherein the mapping function ensures that the cache line containing the object does not collide with cache lines for associated object table objects in the hierarchical object table;
   wherein a single mapping function is used throughout the hierarchical object table to compute addresses for corresponding object table objects from identifiers for objects or lower-level object table objects;
   wherein an object cache that is used to store objects and object table objects is divided into disjoint partitions; and
   wherein each disjoint partition is associated with its own root object table.

2. The method of claim 1
   wherein for each root object table there exists an ordering of the disjoint partitions; and
   wherein the single mapping function maps object table objects from successive levels of the hierarchical object table into successive partitions in the ordering.

3. The method of claim 1, further comprising;
   performing an encoding function on the object identifier and an associated object offset to address a relevant cache line in the object cache;
   wherein the encoding function ensures that partition bits in the object identifier, which specify a partition for the object in the object cache, are unmodified by the encoding process.

4. The method of claim 2, wherein applying the single mapping function to the object identifier involves:
   incrementing a set of partition bits in the object identifier, wherein the set of partition bits are lower order bits of the object identifier that specify a partition for the object in the object cache; and
   shifting remaining bits of the object identifier that are not partition bits, wherein the shifting discards lower order remaining bits and shifts zeros into higher order remaining bits.

5. An apparatus that facilitates avoiding collisions between cache lines containing objects and cache lines containing corresponding object table entries, comprising:
   a receiving mechanism configured to receive an object identifier for an object, wherein the object identifier is used to address the object in an object-addressed memory hierarchy;
   a mapping mechanism configured to apply a mapping function to the object identifier to compute an address for a corresponding object table entry associated with the object;
   wherein the mapping function ensures that a cache line containing the object table entry does not collide with a cache line containing the object;
   wherein the corresponding object table entry is located within an object table object that is part of a hierarchical object table;
   wherein each object table object in the hierarchical object table has a corresponding object table entry in a higher-level object table object until a root object table is reached;

wherein the mapping function ensures that the cache line containing the object does not collide with cache lines for associated object table objects in the hierarchical object table; and wherein the mapping mechanism is configured to use a single mapping function throughout the hierarchical object table to compute addresses for corresponding object table objects from identifiers for objects or lower-level object table objects; and an object cache that is used to store objects and object table objects;

wherein the object cache is divided into disjoint partitions; and wherein each disjoint partition is associated with its own root object table.

6. The apparatus of claim 5, wherein for each root object table there exists an ordering of the disjoint partitions; and wherein the single mapping function maps object table objects from successive levels of the hierarchical object table into successive partitions in the ordering.

7. The apparatus of claim 5, further comprising an encoding mechanism configured to perform an encoding function on the object identifier and an associated object offset to address a relevant cache line in the object cache;

wherein the encoding function ensures that partition bits in the object identifier, which specify a partition for the object in the object cache, are unmodified by the encoding process.

8. The apparatus of claim 6, wherein the mapping mechanism is configured to:

increment a set of partition bits in the object identifier, wherein the set of partition bits are lower order bits of the object identifier that specify a partition for the object in the object cache; and to shift remaining bits of the object identifier that are not partition bits, wherein the shifting discards lower order remaining bits and shifts zeros into higher order remaining bits.

9. A computer system that facilitates avoiding collisions between cache lines containing objects and cache lines containing corresponding object table entries, comprising;

a processor;

a memory;

an object cache;

a receiving mechanism configured to receive an object identifier for an object, wherein the object identifier is used to address the object in an object-addressed memory hierarchy; and a mapping mechanism configured to apply a mapping function to the object identifier to compute an address for a corresponding object table entry associated with the object;

wherein the mapping function ensures that a cache line containing the object table entry does not collide with a cache line containing the object;

wherein the corresponding object table entry is located within an object table object that is part of a hierarchical object table;

wherein each object table object in the hierarchical object table has a corresponding object table entry in a higher-level object table object until a root object table is reached;

wherein the mapping function ensures that the cache line containing the object does not collide with cache lines for associated object table objects in the hierarchical object table;

wherein the mapping mechanism is configured to use a single mapping function throughout the hierarchical object table to compute addresses for corresponding object table objects from identifiers for objects or lower-level object table objects;

wherein the object cache is divided into disjoint partitions; and wherein each disjoint partition is associated with its own root object table.

10. The computer system of claim 9, wherein for each root object table there exists an ordering of the disjoint partitions; and wherein the single mapping function maps object table objects from successive levels of the hierarchical object table into successive partitions in the ordering.

11. The computer system of claim 9, further comprising an encoding mechanism configured to perform an encoding function on the object identifier and an associated object offset to address a relevant cache line in the object cache;

wherein the encoding function ensures that partition bits in the object identifier, which specify a partition for the object in the object cache, are unmodified by the encoding process.

12. The computer system of claim 10, wherein the mapping mechanism is configured to:

increment a set of partition bits in the object identifier, wherein the set of partition bits are lower order bits of the object identifier that specify a partition for the object in the object cache; and to shift remaining bits of the object identifier that are not partition bits, wherein the shifting discards lower order remaining bits and shifts zeros into higher order remaining bits.

* * * * *